Figure 2:
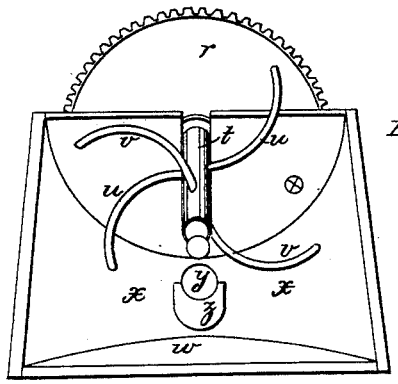
Figure 1:
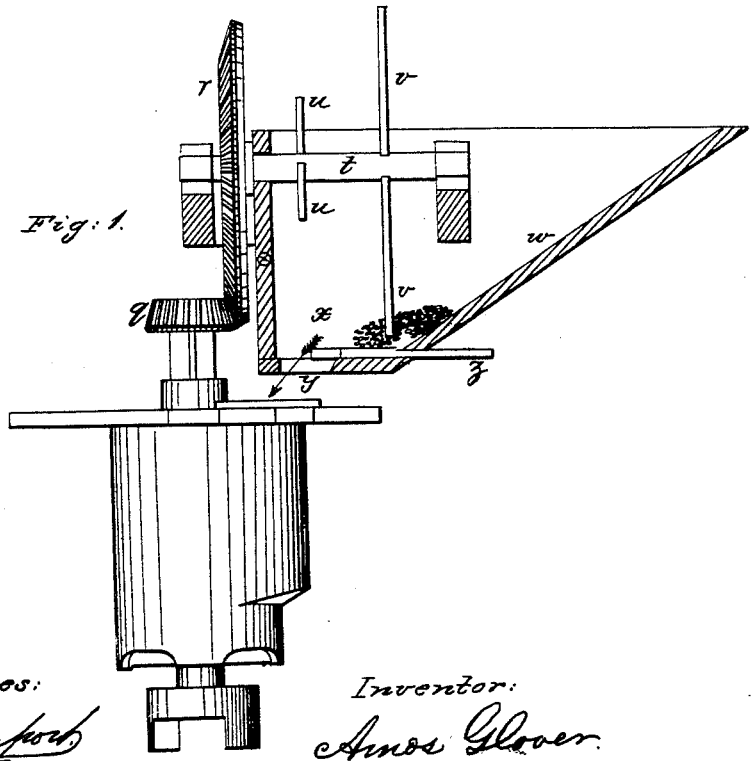

Search Room

ISPENSING.

11

74

A. GLOVER.

Feed Regulator for Mills.

No. 303. A I. Patented Nov. 20, 1860.

Witnessos:

Ben: Franklin

Hansen Crissell.

Inventor:

Amos Glover.

N. PETERS, Photo-Lithographer, Washington, D. C.